(12) United States Patent
Matheis et al.

(10) Patent No.: US 7,799,224 B2
(45) Date of Patent: Sep. 21, 2010

(54) WASTEWATER TREATMENT METHODS

(75) Inventors: Timothy F. Matheis, Palmetto, FL (US); Julie Ward, Tampa, FL (US); Winsel E. Middleton, Ellenton, FL (US); James P. Harshman, Bradenton, FL (US)

(73) Assignee: Siemens Water Technologies Corp., Warrendale, PA (US)

( * ) Notice: Subject to any disclaimer, the term of this patent is extended or adjusted under 35 U.S.C. 154(b) by 332 days.

(21) Appl. No.: 12/022,959

(22) Filed: Jan. 30, 2008

(65) Prior Publication Data

US 2009/0188859 A1 Jul. 30, 2009

(51) Int. Cl.
*C02F 3/00* (2006.01)

(52) U.S. Cl. .................. 210/610; 210/614; 210/739; 210/754; 210/756; 210/758

(58) Field of Classification Search .......... 210/610, 210/614, 739, 754, 756, 758
See application file for complete search history.

(56) References Cited

U.S. PATENT DOCUMENTS

| | | | |
|---|---|---|---|
| 191,476 A | 5/1877 | Seligman |
| 221,232 A | 11/1879 | Hirsh |
| 653,741 A | 7/1900 | Jewell |
| 1,543,939 A | 6/1925 | Maclachlan |
| 1,701,825 A | 2/1929 | Seil |
| 1,991,242 A | 2/1935 | Cole et al. |
| 1,997,252 A | 4/1935 | Fischer |
| 2,171,203 A | 8/1939 | Urbain et al. |
| 2,310,655 A | 2/1943 | Schneider |
| 2,852,584 A | 9/1958 | Komline |
| 3,080,253 A | 3/1963 | Dietz et al. |
| 3,219,576 A | 11/1965 | Makabe |
| 3,236,726 A | 2/1966 | Ross |
| 3,259,571 A | 7/1966 | Marshall et al. |
| 3,300,404 A | 1/1967 | Howe et al. |
| 3,377,271 A | 4/1968 | Cann |
| 3,401,113 A | 9/1968 | Pruessner et al. |
| 3,502,566 A | 3/1970 | Raymond et al. |
| 3,522,173 A | 7/1970 | Lindman et al. |
| 3,607,736 A | 9/1971 | Miyaji |

(Continued)

FOREIGN PATENT DOCUMENTS

CA 2225223 A1 6/1999

(Continued)

OTHER PUBLICATIONS

Altivia Corporation, Letter dated Mar. 4, 2005 from Altivia Corporation to Yogesh Mehta, City of Houston, Public Works and Engineering.

(Continued)

*Primary Examiner*—Chester T Barry

(57) ABSTRACT

Systems and methods for wastewater treatment. A nitrate source may be dosed to a collection tank, such as a wet well, for downstream control of hydrogen sulfide levels in the wastewater. A source of a strong oxidizer may also be dosed to the wet well. The oxidizer, such as chlorite, may temporarily interrupt denitrification processes in the wet well to prevent floatation of undesirable constituents therein. The oxidizer dosage may be generally consistent with the nitrate dosage. An ORP sensor may facilitate regulation of dosing. The nitrate and the oxidizer may be present in a single mixture to be dosed to the wet well.

8 Claims, 4 Drawing Sheets

U.S. PATENT DOCUMENTS

| | | | |
|---|---|---|---|
| 3,639,263 A | 2/1972 | Troschinski et al. |
| 3,697,322 A | 10/1972 | Lee et al. |
| 3,705,098 A | 12/1972 | Shepherd et al. |
| 3,862,851 A | 1/1975 | Speirs et al. |
| 3,867,284 A | 2/1975 | Kappe et al. |
| 3,915,853 A | 10/1975 | Luck |
| 3,930,998 A | 1/1976 | Knopp et al. |
| 3,948,774 A | 4/1976 | Lindman |
| 3,953,335 A | 4/1976 | Jackson |
| 3,957,674 A | 5/1976 | Sano et al. |
| 3,959,127 A | 5/1976 | Bartha et al. |
| 3,959,130 A | 5/1976 | Kloster et al. |
| 3,966,450 A | 6/1976 | O'Neil et al. |
| 3,974,783 A | 8/1976 | Flynn |
| 4,007,262 A | 2/1977 | Bowers |
| 4,049,545 A | 9/1977 | Horvath |
| 4,093,544 A | 6/1978 | Ross |
| 4,098,690 A | 7/1978 | Semmens |
| 4,108,771 A | 8/1978 | Weiss |
| 4,108,777 A | 8/1978 | Kurita |
| 4,110,117 A | 8/1978 | McLeod |
| 4,115,258 A | 9/1978 | Smith et al. |
| 4,118,319 A | 10/1978 | Miyanohara et al. |
| 4,123,355 A | 10/1978 | Poradek et al. |
| 4,125,466 A | 11/1978 | Miyanohara et al. |
| 4,148,726 A | 4/1979 | Smith |
| 4,153,547 A | 5/1979 | McLean |
| 4,169,906 A | 10/1979 | Hallstrom et al. |
| 4,224,154 A | 9/1980 | Steininger |
| 4,229,300 A | 10/1980 | Benes et al. |
| 4,297,216 A | 10/1981 | Ishida et al. |
| 4,304,673 A | 12/1981 | Reynolds et al. |
| 4,340,489 A | 7/1982 | Adams et al. |
| 4,446,031 A | 5/1984 | List |
| 4,456,635 A | 6/1984 | Albanese et al. |
| 4,461,708 A | 7/1984 | Hakulinen et al. |
| 4,501,668 A | 2/1985 | Merk et al. |
| 4,505,819 A | 3/1985 | Barnes et al. |
| 4,537,686 A | 8/1985 | Borbely et al. |
| 4,566,469 A | 1/1986 | Semp et al. |
| 4,574,076 A | 3/1986 | Castrantas |
| 4,612,124 A | 9/1986 | Escrig |
| 4,615,873 A | 10/1986 | Devuyst et al. |
| 4,615,918 A | 10/1986 | Reichert et al. |
| 4,622,149 A | 11/1986 | Devuyst et al. |
| 4,668,541 A | 5/1987 | Fagerlund |
| 4,670,315 A | 6/1987 | Hillemeier et al. |
| 4,675,114 A | 6/1987 | Zagyvai et al. |
| 4,680,127 A | 7/1987 | Edmondson |
| 4,681,687 A | 7/1987 | Mouche et al. |
| 4,710,404 A | 12/1987 | Reichert et al. |
| 4,725,405 A | 2/1988 | Cassin et al. |
| 4,760,027 A | 7/1988 | Sublettet |
| 4,781,842 A | 11/1988 | Nicholson |
| 4,786,525 A | 11/1988 | Kayser et al. |
| 4,802,996 A | 2/1989 | Mouche et al. |
| 4,818,404 A | 4/1989 | McDowell |
| 4,849,128 A | 7/1989 | Timmons et al. |
| 4,911,843 A | 3/1990 | Hunniford et al. |
| 4,913,826 A * | 4/1990 | Mannig et al. ............... 210/707 |
| 4,966,714 A | 10/1990 | Hirosawa et al. |
| 5,008,020 A | 4/1991 | Surash et al. |
| 5,045,213 A | 9/1991 | Bowers |
| 5,076,937 A * | 12/1991 | Montgomery ............... 210/705 |
| 5,114,587 A | 5/1992 | Hagerstedt |
| 5,141,647 A | 8/1992 | Bhadra |
| 5,180,429 A | 1/1993 | Khasanov |
| 5,200,092 A | 4/1993 | Richards et al. |
| 5,211,852 A | 5/1993 | Van de Walle et al. |
| 5,223,031 A | 6/1993 | Sugi et al. |
| 5,228,995 A | 7/1993 | Stover |
| 5,242,708 A | 9/1993 | Fekete et al. |
| 5,246,641 A | 9/1993 | Perkins et al. |
| 5,298,174 A | 3/1994 | Momont et al. |
| 5,336,431 A | 8/1994 | Richards et al. |
| 5,340,469 A | 8/1994 | Montgomery |
| 5,350,516 A | 9/1994 | Bhadra |
| 5,350,522 A | 9/1994 | Fyson |
| 5,352,444 A | 10/1994 | Cox et al. |
| 5,385,842 A | 1/1995 | Weimer et al. |
| 5,422,015 A | 6/1995 | Angell et al. |
| 5,480,550 A | 1/1996 | Sublette |
| 5,482,630 A | 1/1996 | Lee et al. |
| 5,500,368 A | 3/1996 | Tatnall |
| 5,514,357 A | 5/1996 | Richmond et al. |
| 5,525,155 A | 6/1996 | Allen |
| 5,603,832 A | 2/1997 | Hoyvik et al. |
| 5,616,283 A | 4/1997 | Huege et al. |
| 5,620,744 A | 4/1997 | Huege et al. |
| 5,683,748 A | 11/1997 | Gunderson |
| 5,705,072 A | 1/1998 | Haase |
| 5,718,944 A | 2/1998 | Miller |
| 5,807,587 A | 9/1998 | Cox et al. |
| 5,833,864 A | 11/1998 | Miller et al. |
| 5,834,075 A | 11/1998 | Miller |
| 5,905,037 A | 5/1999 | Cooney, Jr. et al. |
| 5,948,269 A | 9/1999 | Stone |
| 5,951,946 A | 9/1999 | Eaton et al. |
| 5,958,334 A | 9/1999 | Haddon |
| 5,984,993 A | 11/1999 | Mainz et al. |
| RE36,651 E | 4/2000 | Hunniford et al. |
| 6,045,695 A | 4/2000 | Janssen et al. |
| 6,056,997 A | 5/2000 | Miller |
| 6,059,973 A | 5/2000 | Hudson et al. |
| 6,136,193 A | 10/2000 | Haase |
| 6,146,522 A | 11/2000 | Fernholz et al. |
| 6,221,652 B1 | 4/2001 | Janssen et al. |
| RE37,181 E | 5/2001 | Hunniford et al. |
| 6,235,196 B1 | 5/2001 | Zhou et al. |
| 6,309,597 B1 | 10/2001 | Ballinger, Jr. et al. |
| 6,409,926 B1 | 6/2002 | Martin |
| 6,410,305 B1 | 6/2002 | Miller et al. |
| 6,419,817 B1 | 7/2002 | Martin |
| 6,576,144 B1 | 6/2003 | Vineyard |
| 6,620,315 B2 | 9/2003 | Martin |
| 6,623,647 B2 | 9/2003 | Martin |
| 6,652,758 B2 | 11/2003 | Krulik |
| 6,660,163 B2 | 12/2003 | Miklos |
| 6,666,975 B1 | 12/2003 | Chen et al. |
| 6,716,359 B1 | 4/2004 | Dennis, II |
| 6,773,604 B2 | 8/2004 | Walton et al. |
| 7,087,172 B2 | 8/2006 | Hunniford |
| 7,138,049 B2 | 11/2006 | Hunniford et al. |
| 7,160,712 B2 | 1/2007 | Christiansen |
| 7,186,341 B2 | 3/2007 | Hunniford et al. |
| 7,285,217 B2 | 10/2007 | Simpson et al. |
| 7,326,340 B2 | 2/2008 | Harshman et al. |
| 7,390,399 B2 | 6/2008 | Dennis et al. |
| 2002/0102229 A1 | 8/2002 | Wegner |
| 2004/0226891 A1 | 11/2004 | Dentel |
| 2005/0077251 A1 | 4/2005 | Rieth et al. |
| 2005/0142096 A1 | 6/2005 | Wegner |
| 2006/0006121 A1 | 1/2006 | Simpson et al. |
| 2006/0131245 A1 | 6/2006 | Dennis, II et al. |
| 2007/0196319 A1* | 8/2007 | Alfrey et al. ............... 424/76.2 |
| 2009/0188859 A1 | 7/2009 | Matheis et al. |
| 2009/0250389 A1 | 10/2009 | Simpson et al. |
| 2010/0012558 A1 | 1/2010 | Matheis |

FOREIGN PATENT DOCUMENTS

| | | |
|---|---|---|
| CA | 2169319 C | 1/2003 |
| DE | 34-14556 | 10/1985 |
| GB | 424919 | 3/1935 |

| | | |
|---|---|---|
| GB | 2123516 | 2/1984 |
| JP | 57-187099 | 11/1982 |
| JP | 10-328676 | 12/1998 |
| JP | 11-156374 | 6/1999 |

OTHER PUBLICATIONS

Badia et al., Caustic Spray for Sewer Crown Corrosion Control, 11 pages.
Barber et al., "Chemical Control of Hydrogen Sulfide From Anaerobic Swine Manure," Canadian Agricultural Engineering, pp. 90-96, vol. 17, No. 2, Dec. 1975.
Basic Research on Sulfide Occurrence and Control in Sewage Collection Systems, Los Angeles County Sanitation District, NTIS, U.S. Dept. of Commerce, Feb. 28, 1969.
Beardsley et al., "Removal of Sewer Odors by Scrubbing with Alkaline Solutions," Sewage and Industrial Wastes, vol. 30, Jan.-Dec. 1958, pp. 220-225.
"Biochemical Oxidation of Polluted Lake Sediment with Nitrate—A new Lake Restoration Method", 1976.
Bryan, "Experiences with Odor Control at Houston, Texas," Sewage and Industrial Wastes, vol. 28, No. 12, Dec. 1956, pp. 1512-1514.
Bowker and J. Smith, EPA Design Manual, U.S. Environmental Protection Agency, EPA/625/I-85/018 (Oct. 1985), pp. 1-132.
Bowker et al., "Odor and Corrosion Control in Sanitary Sewerage Systems and Treatment Plants," Copyright 1989, ISBN 0-8155-1192-2, pp. 59 and 60.
Carpenter, W.T. "Sodium Nitrate Used to Control Nuisance", Water Works and Sew., 79, 175 (1932).
Caffey et al., "Magnesium Hydroxide Feed Reduces Odor and Provides pH Stabilization at a North Texas Municipal Wastewater Plant," Texas Water 2007 Conference Proceedings, Wastewater Odor Control, pp. 1-12.
Cox, "Odor Control and Olfaction," Pollution Sciences Publishing Company, pp. 85, 454, 457, undated.
Dague, R.R, "Fundamentals of Odor Control", Journal Water Pollution Control Federation, 44(4): 583-594; Apr. 1972.
Davis Process Division of Davis Water & Waste Industries, Inc.; Process Division Technical Bulletin No. B-401, Bioxide . . . the natural solution, A Proprietary Product, Designed to Promote Naturally Occurring Process Within Wastewater Collection and Treatment Systems Which Eliminate Order Producing Compounds.
"Detection, Control, and Correction of Hydrogen Sulfide Corrosion in Existing Wastewater Systems," United States Environmental Protection Agency, Office of Water (WH-547) EPA 8320R-92-001 Sep. 1992.
Directo et al., "Pilot plant study of physical-chemical treatment", Journal Water Pollution Control Federation, 649(1)):2,081-2,098; Oct. 1977.
Dixon, K. L. et al., The Effect of Sulfur-Based Reducing Agents and GAC Filtration on Chlorine Dioxide By-products, Research and Technology, Journal AWWA, May 1991, pp. 48-55.
Jenneman et al., "Effect of Nitrate on Biogenic Sulfide Production,"Applied and Environmental Microbiology, Jun. 1986, vol. 51, No. 6, pp. 1205-1211 (7 pages).
Excerpts from ASCE Manuals and Reports on Engineering Practice—No. 69 titled "Sulfide in Wastewater Collection and Treatment Systems.".
Eliassen, R., et al., "The Effect of Chlorinated Hydrocarbons on Hydrogen Sulfide Production", Sew. Works Jour., 21, 457 (1949).
Fales, A.L., "Treatment of Industrial Wastes from Paper Mills and Tannery on Neponset River", Jour. Ind. Eng. Chem., 21, 216 (1929).
Geraghty & Miller, Inc., "Five Year Review of Remedial Actions at the Van Waters & Rogers Inc., Project No. AZ0474.011," Prepared for Univar Corporation by Geraghty & Miller, Inc., Nov. 8, 1995.
Griese, Mark H. et al., Using Reducing Agents to Eliminate Chlorine Dioxide and Chlorite Ion Residuals in Drinking Water, Research and Technology, Journal AWWA, May 1991, pp. 56-61.
Gordon, Gilbert et al., Minimizing Chlorite Ion and Chlorate Ion I Water Treated with Chlorine Dioxide, Research and Technology, Journal AWWA, Apr. 1990, pp. 160-165.

Hale, Bert et al., Use of Vitamin C and Sodium Erythorbate for Chlorite Reduction—Field Trial Results, AWA A1-MS Section Annual Conference, Beau Rivage Resort and Casino, Biloxi, MS, Oct. 5-7, 2003, pp. 1-10.
Helmer, R. et al., editors, "Water Pollution Control—A Guide to the Use of Water Quality Management Principles," E & FN Spon. (1997).
Higgins, M.J. et al., "Controlling Hydrogen Sulfide in Wastewater Using Base Addition," Proceedings of WEFTEC® '97, Water Environment Federation, 70$^{th}$ Annual Conference & Exposition, Chicago, IL, vol. 2, Part 1, "Residuals and Biosolids Management"—Part II—Collection Systems," (1997) pp. 587-594.
Heukelekian, H., "Effect of the Addition of Sodium Nitride to Sewage on Hydrogen Sulfide Production and B.O.D. Reduction", Sewage Works Journal 15(2):255-261 (1943).
Heukelekian, H., "Some Bacteriological Aspects of Hydrogen Sulfide Production from Sewage", Sew. Works Jour. 20, 490 (1948).
James, "Control Sewer Crown Corrosion Using the Crown Spray Process," U-Tech Underground Technology, Underground Construction, Sep. 2004, pp. 60-65, www.undergroundconstructiononline.com.
Lang, M., "Chemical Control of Water Quality In A Tidal Basin", Journal WPCF, 1414-1416 (1966).
Lawrance, W.A., "The Addition of Sodium Nitrate to the Androscoggin River", Sew. and Ind. Wastes, 22, 820 (1950).
Lee et al., "Metals Meet Their Match," Water Environment & Technology, Sep. 1993, pp. 69-73.
Lorgan, G.P., et al., "Nitrate Addition for the Control of Odor Emissions from Organically Overloaded, Super Rate Trickling Filters", 33rd Ann. Purdue Ind. Waste Conf., West Lafayette, Ind., (1978).
Marshall et al., "Preparing Collection Systems for Water Conservation," Water Environment & Technology, Aug. 1993, pp. 52-57.
McKinney, R.E., "The Role of Chemically Combined Oxygen in Biological Systems", Jour. San. Eng. Div., proc. Amer. Soc. Civil Engr., 82 SA4, 1053 (1956).
Metcalf and Eddy, Wastewater Engineering, Treatment, Disposal, and Reuse, 3$^{rd}$ edition, 1991, pp. 108-110; 769-770.
"Methods for Chemical Analysis of Water and Wastes", U.S. Environmental Protection Agency, (1974).
Microbial Energy Generation/Oxidation of Inorganic Substrates, pp. 158-159.
'Mother Knows Best! The fascinating healing benefits of DHEA the body's "mother hormone!"' Bio/Tech News, 1995, pp. 1-8.
Moss et al., "Full-scale use of physical/chemical treatment of domestic wastewater at Rocky River, Ohio", Journal Water Pollution Control Federation, 49(11):2,249-2,254; Nov. 1977.
Newell, C. J., "Modeling Intrinsic Remediation With Multiple Electron Acceptors: Results From Seven Sites", Petroleum Hydrocarbons and Organic Chemicals in Ground Water Conference, Houston Texas, Nov. 29, 1995.
Olenik, "Domestic Sewage and Refuse Odor Control,"Industrial Odor Technology Assessment, 1956, Ann Arbor Science Publishers Inc., pp. 117-146.
Ondrus, Martin G. et al., the Oxidation of Hexaaquoiron (II) by Chlorine (III) in Aqueous Solution, Inorganic Chemistry, vol. 11, No. 5, 1972, pp. 985-989.
Painter, H.A., "A Review of Literature on Inorganic Nitrogen Metabolism in Microorganisms", Water Research, The Journal of the International Assocation on Water Pollution Research, vol. 4, No. 6, (1970).
Poduska, R.A., "Operation, control, and Dynamic Modeling of the Tennessee Eastman Company Industrial Wastewater Treatment System", 34th Ann. Purdue Indust. Waste Conf., Lafayette, Md. (1970).
Poduska, R.A., et al., "Successful storage lagoon odor control", Journal Water Pollution Control Federation, 53(3):299,310; Mar. 1981.
Prakasam, T.B.S., et al., "Microbial Dentrification of a Wastewater Containing high Concentrations of Oxidized Nitrogen", Proceedings of the 31st Industrial Waste Conference, May 4-6, 1976, Purdue University.
Price, E.C., et al., "Sewage Treatment Plants Combat Odor Pollution Problems", Water and Sew. Works, 125, 10, 64 (1978).

Product Report/Surfactants for household detergents—petrochemical raw materials and uses, pp. 40-41 & 46, C&EN, Jan. 24, 1994.

Pomeroy, "Generation and Control of Sulfide in Filled Pipes", Sewage and Industrial Wastes, vol. 31, No. 9, 1959, p. 1082.

Pomeroy et al., "Progress Report on Sulfide Control Research," Sewage Works Journal, vol. 18, No. 4, Jul. 1946, p. 597.

Pomeroy, "Calcareous Pipe for Sewers," Journal Water Pollution Control Federation, vol. 41, No. 8, Aug. 1969, p. 1491.

Pomeroy, "Controlling Sewage Plant Odors," Consulting Engineer, Feb. 1963, pp. 101-104.

Pomeroy et al., "Sulfide Occurrence and Control in Sewage Collection Systems," Grant No. 11010 ENX, U.S. Environmental Protection Agency, Washington, D.C., 173 pages.

Pomeroy et al., "Feasibility Study on In-Sewer Treatment Methods," U.S. Environmental Protection Agency, PB 271 445, Aug. 1977, 106 pages.

Pomeroy et al., "Process Design Manual for Sulfide Control in Sanitary Sewerage Systems," U.S. Environmental Protection Agency, Oct. 1974, 13 pages.

Press Release "ACM Products to Save Los Angeles Millions of Dollars in Sewer Pipe Replacement Costs" Aug. 2001, 1 page.

Reid, et al., "Sewer Odor Studies," Sewage and Industrial Wastes, vol. 28, No. 8, Aug. 1956, pp. 991-997.

Renholds, "In Situ Treatment of Contaminated Sediments," Dec. 1998, U.S. Environmental Protection Agency Office of Solid Waste and Emergency Response, Technology Innovation Office, Washington, D.C.

Rodriguez-Gomez et al., "Inhibition of Sulfide Generation in a Reclaimed Wastewater Pipe by Nitrate Dosage and Denitrification Kinteics," Water Environment Research, vol. 77, No. 2, pp. 193-198 (Mar./Apr. 2005).

Ryan, W.A., "Experiences with Sodium Nitrate Treatment of Cannery Wastes", Sew. Works Jour., 17, 1227 (1945).

Sanborn, N.H., "Nitrate Treatment of Cannery Waste", The Fruit Products Journal and American Vinegar Industry, (1941).

Santry, I.W., Jr., "Hydrogen Sulfide Odor Control Measures", Jour. Water Poll. Control Fed., 38 459 (1966).

Santry, Jr., "Hydrogen Sulfide in Sewers," Journal WPCP, vol. 35, No. 12, Dec. 1963, pp. 1580-1588.

*Sewage Works Journal, published by California Sewage Works Association, Jul. 1946, vol. XVIII, No. 1, pp. 34-45.

Sewer Corrosion Control and Rehabilitation, County Sanitation Districts of Los Angeles County, 5 pages.

Simpson, The Reduction of the Chlorite Ion, Fourth International Symposium on Chlorine Dioxide, Feb. 15 & 16, 2001, Caesars' Palace, Las Vegas, Nevada., pp. 1-10.

"Standard Methods for the Examination of Water and Wastewater", 14th Ed., Amer. Pub. Health Assn., Wash. D.C., 499-509 (1976).

Stahl, J., "Notice Inviting Bids for Liquid Magnesium Hydroxide," to the Purchasing Agent of County Sanitation District No. 2 of Los Angeles County, State of California, Aug. 2002, 6 pages.

Sydney et al., "Control concrete sewer corrosion via the crown spray process," Water Environment Research, vol. 68, No. 3, May/Jun. 1996, pp. 338-342.

Tarquin, A. et al., Reduction of Chlorite Concentrations in Potable Water and Ferrous Chloride, Disinfection Practice, Water/Engineering & Management, Feb. 1995, pp. 35-37.

Thistlethwayte, "The Control of Sulphides in Sewerage Systems," Chapter 13—Corrective Measures for Existing Systems, pp. 153-164, (1972).

USFilter Corporation, Strantrol MG/L 5 Controller, Data Sheet, 2004.

USFilter Wallace & Tiernan Worldwide Multi Function Analysers Depolox 4, Technical Information, 1999.

"Odor & Corrosion Control Microbiology—Metabolic Pathways of Odor & Corrosion Potential", In-Pipe Technology, 6 pg.

Ernest W. Steel, "Water Supply and Sewerage", Chapter 27, pp. 600-601 (4th Ed. 1960).

*Vulcan Chemicals Technical & Environmental Services, Technical Data Sheet, "Hydrogen Sulfide Control in Wastewater Collection Systems," TD5 642-420, 1 page, Aug. 1995.

Willenbring et al., "Calcium Nitrate" (incomplete title), Oct. 1988 or earlier.

* cited by examiner

WASTEWATER TREATMENT METHODS

FIELD OF THE TECHNOLOGY

The present invention relates generally to wastewater treatment and, more particularly, to systems and methods for inhibiting floatation of undesirable constituents in wastewater treatment operations.

BACKGROUND

Wastewater is generally collected by gravity for treatment where the topography of the terrain will allow. In many wastewater treatment systems, a low point collection tank or wet well is used to collect wastewater for pumping from one point to the next. When water is pumped over long distances, such as over about 100 yards, biomass in the wastewater may deplete dissolved oxygen available for biological metabolism. In the absence of dissolved oxygen which is typically supplied from air, biomass may begin to reduce alternate sources of oxygen. Nitrate salts and sulfate salts, for example, are alternate sources of oxygen for biochemical metabolism.

Odor control in wastewater treatment processes is typically focused on the prevention and elimination of hydrogen sulfide. Hydrogen sulfide is a colorless and odorous gas created in wastewater collection systems by the biochemical reduction of sulfate. Sulfate is a naturally occurring substance present in most well water supplies, dissolved naturally therein through geologic contact. Sulfate reducing bacteria are commonly present in wastewater collection and treatment systems. They convert sulfate to sulfide ions in wastewater systems deficient of dissolved oxygen, a condition typically occurring when wastewater is pumped long distances. Sulfide ions in turn react with excess hydrogen ions to form hydrogen sulfide gas which has an offensive odor. Humans can sense hydrogen sulfide at levels as low as about 1 ppb in air. Hydrogen sulfide is particularly offensive in concentrations near about 10 ppm and can cause respiratory paralysis if in excess of about 1000 ppm.

Nitrate salts, such as those of sodium and calcium, are commonly used for odor control in wastewater collection and treatment systems. Nitrate salts may generally offer an alternative source of oxygen to bacteria for biochemical metabolism, such that sulfates will not be reduced, and may also be effective in removing hydrogen sulfide. Liquid solutions of calcium nitrate and/or sodium nitrate may be injected into a wastewater collection system to remove and control hydrogen sulfide downstream. Nitrate salts can also be used to remove existing sulfide present at the point of addition of nitrate material. The nitrate is generally reduced by a denitrification process to odorless nitrogen gas, which may be safely emitted from the wastewater treatment system.

Floatation of solids and/or other undesirable constituents such as fats, oils and greases in a wastewater treatment system, particularly in collection vessels such as wet wells, may cause maintenance and/or operational issues. Floating waste may be odorous, obstruct visibility, impede sampling and/or dosing, and generally interfere with treatment equipment, including pumps, hoses and level controls. Various mechanical removal techniques conventionally address this nuisance.

SUMMARY

Aspects relate generally to systems and methods for wastewater treatment.

In accordance with one or more aspects, a biological waste treatment system may comprise a waste stream comprising an undesirable constituent floatable in combination with a byproduct of the waste stream, a source of a nitrate fluidly connected to the waste stream, and a source of an oxidizer fluidly connected to the waste stream.

In accordance with one or more aspects, a biological waste treatment system may comprise a waste stream comprising a solid waste material, a nitrate source fluidly connected to the waste stream, and means for inhibiting floatation of the solid waste material within the system.

In accordance with one or more aspects, a method of treating waste may comprise dosing a nitrate to a waste stream comprising at least one undesirable constituent, and dosing an oxidizer to the waste stream in an amount sufficient to inhibit floatation of the at least one undesirable constituent.

In accordance with one or more aspects, a method of facilitating waste treatment may comprise providing a source of an oxidizer in response to detecting floatation of an undesirable constituent in wastewater treated with a nitrate.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
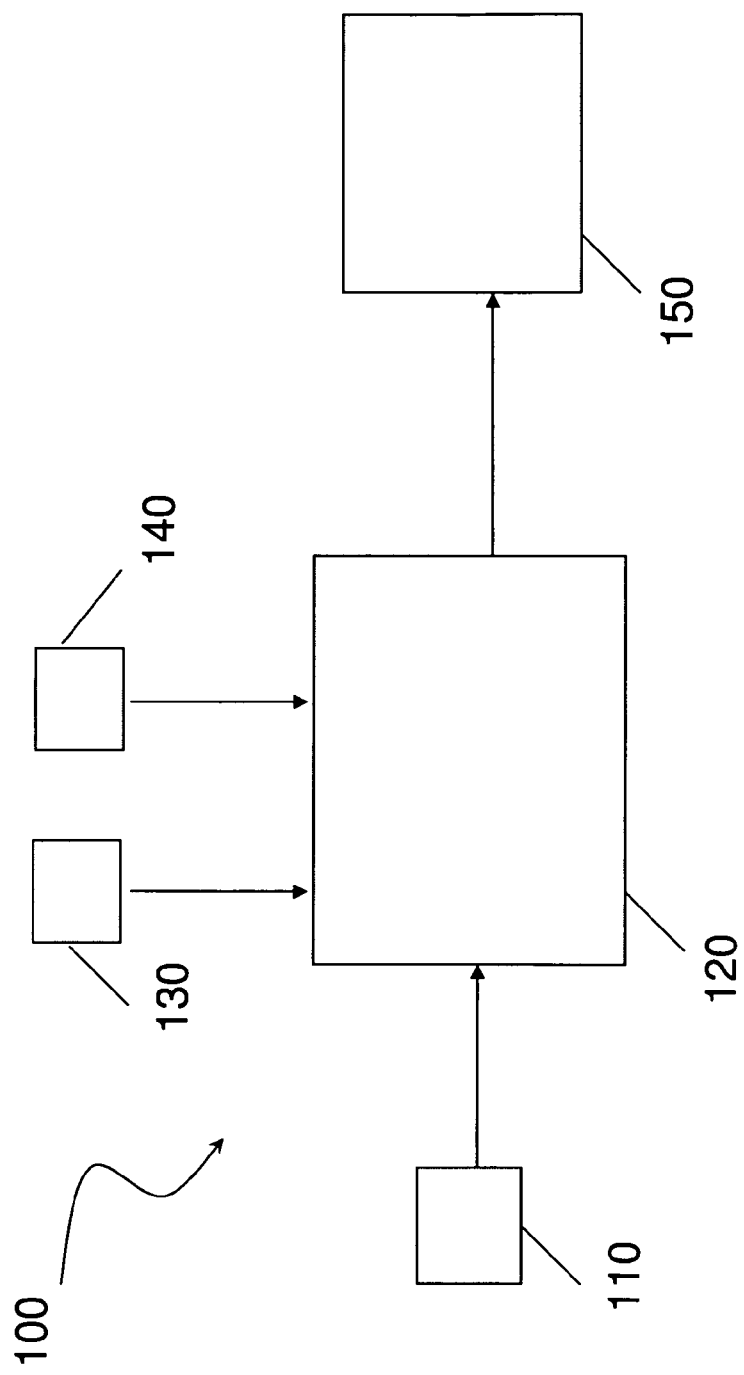
FIG. 1 presents a wastewater treatment system in accordance with one or more embodiments.
Figure 2B:
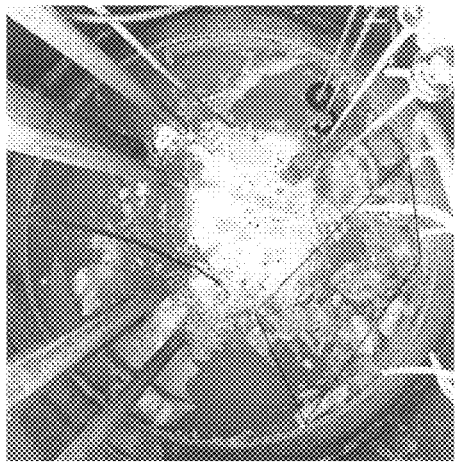
FIGS. 2A-2H presents photographic data referenced in the accompanying Example.
Figure 2D:
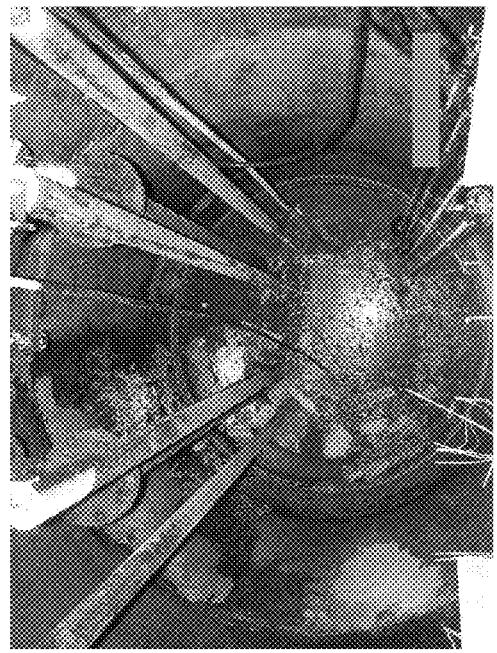
Figure 2A:
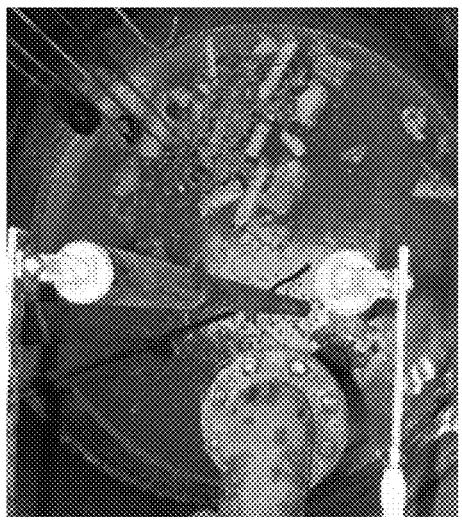
Figure 2C:
Figure 2F:
Figure 2H:
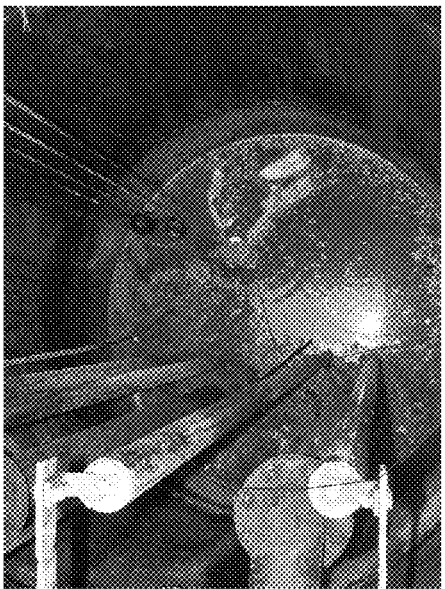
Figure 2E:
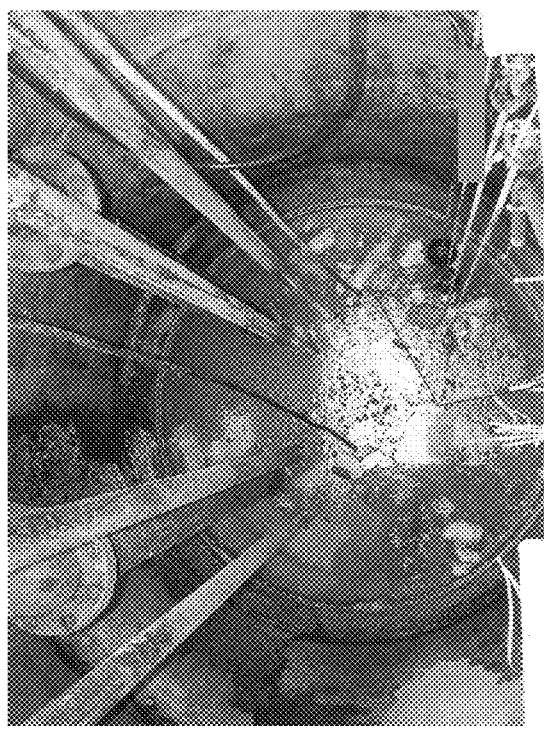
Figure 2G:
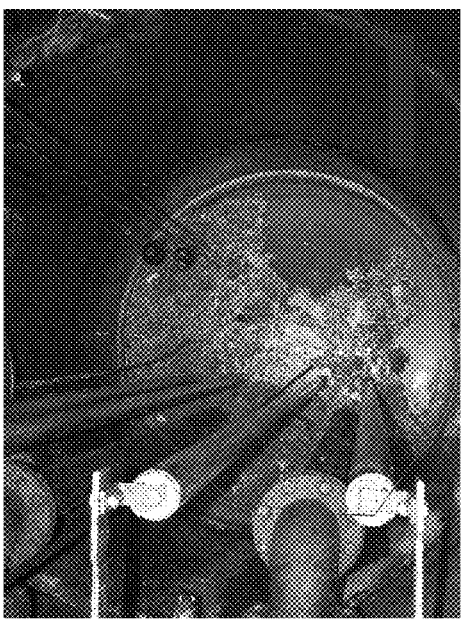

One or more embodiments relates generally to wastewater treatment systems and methods. The systems and methods may provide a substantial advantage by controlling hydrogen sulfide levels in wastewater and by also inhibiting and/or preventing floatation of undesirable constituents in a wastewater treatment system. Embodiments may be particularly effective in inhibiting and/or preventing floatation of materials such as fats, oils, greases, organics and various solids in a wastewater collection tank, for example, in a wet well. Thus, the systems and methods disclosed herein may diminish the need for or dependence upon system equipment intended for the removal of floating matter, thus streamlining and/or augmenting the efficiency of wastewater treatment systems. The frequency and/or intensity of required system cleaning may also be reduced. Embodiments may prevent damage to system equipment, enhancing the durability and/or longevity of wastewater treatment systems, and facilitate treatment dosing to the benefit of end users.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

In accordance with one or more embodiments, a wastewater treatment system may receive wastewater from a community, industrial or residential source during typical operation. For example, the wastewater may be delivered from a municipal or other large-scale sewage system. Alternatively, the wastewater may be generated, for example, by food processing or pulp and paper plants. The wastewater may be moved through the system by any operation upstream or downstream of the system.

The wastewater may generally be any stream of waste, bearing at least one undesirable constituent, deliverable to the wastewater treatment system for treatment and/or removal. In some embodiments, the undesirable constituent may be a biodegradable material, such as an inorganic or organic compound that may participate or be involved in the metabolism of a microorganism. For example, the undesirable constituent may include sulfate, nitrate, nitrite, phosphorous, ammonia, and the like, typically present in wastewater. In some embodiments, paper, textiles, sand and other solids may be present in the wastewater stream. Other undesirable constituents may include fats, oils and/or greases. As discussed further herein, some undesirable constituents may generally be substantially floatable or buoyant alone or in combination with a byproduct of the wastewater stream. The type and concentration of undesirable constituents present in the wastewater may be site-specific. Communities may establish regulations regarding these undesirable constituents and what may be released from the treatment system. For the purposes of the present description, wastewater may refer to what is fed to the system for treatment and what is treated throughout.

In accordance with one or more embodiments, and with reference to FIG. 1, wastewater may enter a wastewater treatment system 100 from a source 110 at any flow rate Q. System 100 may generally be sized to accommodate any flow rate Q. Without being limited, it is believed that the flow rate Q may be as high as 3 million gallons per day. It is also recognized that lower and higher flow rates can be accommodated by various embodiments.

In accordance with one or more embodiments, a wastewater treatment system 100 may generally include one or more wastewater storage tanks, basins or vessels 120. The storage tank 120 may generally be constructed and arranged to facilitate collection of wastewater for treatment by the system. In some embodiments, a storage tank 120 may hold a desired volume of wastewater to feed one or more downstream treatment operations. For example, a storage tank 120 may be capable of accommodating any fluctuation in flow rate Q to normalize flow through system 100. In other embodiments, storage tank 120 may participate in moving wastewater over a distance for treatment. For example, a storage tank 120 may be used to transport wastewater from a source 110 to an end of intermediate location by collecting it for subsequent pumping or other distribution. A storage tank 120 may also generally provide a residence time, such as may allow for activation of one or more dosed treatment agents. The size and shape of the storage tank may be site-specific and may vary based on requirements of an intended application. Likewise, residence time of wastewater within the storage tank 120 may also vary based on established design parameters. In at least one embodiment, storage tank 120 may be a wet well or like structure. Equipment such as pumps, hoses, level sensors and cleaning devices may be associated with a wet well 120 as commonly known in the art. Various biological environments may exist in wet well 120. In some embodiments, for example, wet well 120 may be generally characterized by substantially anoxic conditions, or otherwise as containing low or substantially no dissolved oxygen.

In accordance with one or more embodiments, wastewater treatment system 100 may include a source of one or more compounds 130 generally capable of controlling hydrogen sulfide levels in the wastewater. In some embodiments, that compound may be capable of removing at least a portion of one or more undesirable constituents present in the wastewater, such as hydrogen sulfide. In at least one embodiment, that compound may be capable of inhibiting the reduction of sulfates by sulfate reducing bacteria in the wastewater to prevent formation of hydrogen sulfide. Without wishing to be bound by any particular theory, a compound supplied from source 130 may provide an alternative source of oxygen or alternative metabolic pathway such that upon depletion of dissolved oxygen levels within the wastewater, bacteria will reduce that compound rather than sulfate. In this way, hydrogen sulfide levels may be controlled.

Compound from source 130 may be added at any point within treatment system 100. In some embodiments, that compound may be dosed to a wastewater stream at any point downstream of source 110. In at least one embodiment, the compound may be dosed in a wet well 120. In other embodiments, the compound may be dosed upstream or downstream of any wet well 120 present. In still other embodiments, the compound may be dosed at more than one point in system 100. In some embodiments, any amount of time required for activation of a compound supplied from source 130 may influence strategic dosing that compound, such as may relate to dosage quantity and/or positioning. For example, the compound may be dosed at one position for treatment of a downstream issue. An amount and/or frequency of dosing of compound from source 130 may be site-specific and depend on various system parameters as well as characteristics of a wastewater stream to be treated.

In accordance with one or more embodiments, the source of compound 130 may be a source of at least one nitrate-based compound. In some embodiments, source of compound 130 may be a source of at least one nitrate salt. For example, a source of calcium nitrate and/or sodium nitrate may be in fluid communication with one or more components of system 100. Nitrate salts may be biochemically reduced to nitrogen gas through a process known as denitrification which is well documented in wastewater treatment processes. In at least one embodiment, a source of nitrate-based compound(s) 130 such as nitrate salts may be added to a wet well 120 or low point collection tank of a wastewater conveyance system for hydrogen sulfide control. In typical operation, bacteria may reduce nitrate rather than sulfate in low dissolved oxygen environments. The nitrate may also be efficient in removing hydrogen sulfide present in a wastewater stream, for example, as disclosed in U.S. Pat. No. 4,911,843 to Hunniford et al. which is hereby incorporated herein by reference in its entirety for all purposes. The biochemical reaction reduces nitrate to nitrogen, and sulfide is oxidized primarily to sulfate. Compound from source 130 should generally be supplied in an effective amount to remove hydrogen sulfide and/or to prevent its formation. No direct relationship between the amount of sulfide treated and the amount of nitrate applied for the sulfide prevention mechanism appears to be known. In some nonlimiting embodiments, an effective nitrate to sulfide mass ratio may be about ten-to-one but any other ratio may be implemented. Factors such as wet well volume, wastewater flow rate and pH level of wastewater may impact dosage. Nitrogen gas is generated by denitrification and may be emitted, such as by vent structures commonly designed in wastewater collection piping systems. In some embodiments, nitrogen gas or bubbles may therefore be a byproduct of the waste stream.

Without wishing to be bound by any particular theory, the emission of nitrogen gas from denitrification reactions may result in small bubble formation which may generally promote floatation of undesirable constituents in a wet well, such as by facilitating their transport to a surface of wastewater contained therein. For example, nitrogen bubbles may generally attach to undesirable constituents and carry them to the surface. Thus, in accordance with one or more embodiments, one or more undesirable constituents may be floatable in combination with a byproduct of the waste stream, such as in combination with nitrogen gas or nitrogen bubbles. Systems involving treatment with high levels of nitrate may also be relatively more prone to elevated grease content. Floatable material such as oil and grease may be suspended in nitrogen foam at the water surface of wastewater collection wet well structures and, with interaction in air, may dry to a hardened surface material. For example, grease may collect with solids at the wastewater surface to create a solid floating mass. Floating solids may pose maintenance and or operational issues, particularly in a wet well or like structure where it may interfere with pumps, level sensors cleaning devices and/or other associated equipment.

In accordance with one or more embodiments, system 100 may include a source of a compound 140 generally capable of interrupting a denitrification process. In some embodiments, that compound may be generally capable of temporarily interrupting a denitrification process, such as in the vicinity of a wet well 120. Without wishing to be bound by any particular theory, interrupting denitrification may stop the formation of nitrogen emission and hence foam or float in a low point wastewater collection tank or wet well 120 with excess nitrate ions. In some embodiments, compound from source 140 may provide an alternative metabolic pathway which may be favored by bacteria even in the presence of compound from source 130. For example, compound from source 140 may be more readily reduced by bacteria than compound from source 130 in some embodiments. Thus, as long as sufficient compound from source 140 is available, it will be more likely to be reduced than compound from source 130. Compound from source 140 may also be capable in removing one or more undesirable constituents, such as hydrogen sulfide.

Compound from source 140 may be dosed at any point in system 100. Dosage quantity, rate and/or position may be site-specific and may vary based on an intended application. In embodiments where it may be desirable to interrupt denitrification in the vicinity of wet well 120, such as to inhibit floatation of undesirable constituents therein, compound from source 140 may be dosed upstream of or at wet well 120. Also in such embodiments, the amount of compound from source 140 dosed may be sufficient to temporarily interrupt denitrification in the wet well, therefore allowing reduction of nitrate to resume subsequent to depletion of dosed compound from source 140, such as downstream of wet well 120, for hydrogen sulfide control. In some embodiments, compound from source 140 may be dosed consistent with an amount of compound from source 130 dosed to system 100, for example nitrate. In some embodiments, compound from source 140 may be dosed in proportion to or based on an amount of compound from source 130 dosed to system 100. In other embodiments, compound from source 140 may be dosed so as to provide an excess or residual of such compound in a desired location. In at least one embodiment, compound from source 140 may be dosed based on or in response to a detected oxidation reduction potential (ORP) level of a wastewater stream to be treated. Without wishing to be bound by any particular theory, a low ORP level may indicate a likelihood that denitrification will occur. Compound from source 140 may be dosed in response to such an indication to temporarily interrupt the denitrification process.

In accordance with one more embodiments compound from source 140 may comprise an oxidizer. In at least one embodiment, that compound may be a strong oxidizer relative to compound from source 130. In some nonlimiting embodiments, compound from source 140 may be a chlorine-based oxidizer. For example, that compound may include one or more of chlorine dioxide, stabilized chlorine dioxide, chlorite, sodium chlorite, buffered sodium chlroite and sodium hypochlorite. In accordance with at least one embodiment, addition of an amount of strong oxidizer, such as chlorite, to a wet well 120 which may interrupt denitrification and hence stop the formation of nitrate induced foam in a wastewater collection tank with excess nitrate ion.

In accordance with one or more embodiments, one or more of compounds from sources 130, 140 may be manually added to water treatment system 100. In other embodiments, addition of one or more of compounds from sources 130, 140 may be automatically administered. For example, a controller may be used to dose one or more compounds from sources 130, 140 directly into a wet well 120, such as based on a predetermined time interval. Compounds from sources 130, 140 may be stored in chemical storage tanks or drums. In at least one embodiment, a source of compound 130 may be the same as a source of compound 140. For example, compounds from sources 130 and 140 or may be mixed in accordance with a predetermined ratio to form a mixture or compounds may be mixed to form a single source for dosing to system 100.

In accordance with one or more embodiments, wastewater treatment system 100 may include one or more treatment units 150 upstream or downstream of wet well 120. Some treatment units 150 may generally facilitate filtration and/or clarification of wastewater. A treatment unit 150 may screen an influent wastewater stream to collect solids or other undesirable constituents, such as fats, oil and grease. In some embodiments, for example, the treatment unit 150 may include a perforated plate continuous screen. Treatment units 150 may involve chemical treatment systems which, for example, precipitate, convert, or adjust a condition of a wastewater stream. Other treatment units may involve biological treatment of the wastewater stream to biologically convert one or more undesirable constituents to innocuous compounds. Some embodiments may include one or more polishing treatment units to further treat an effluent stream before it is released from the system 100. Wastewater may also be recycled within system 100 for further treatment.

In accordance with some embodiments, the wastewater treatment system can include one or more sensors for measuring at least one property or operating condition of the system, such as sensors for measuring ORP, BOD, pH, temperature, salinity, turbidity, and pressure drop, for example, at different points in the system thus enabling monitoring for system control, maintenance and/or optimization. Alternatively, rather than requiring any electronic or electro-mechanical sensors, the measurement of various characteristics could alternatively be based upon the senses of an operator. As discussed herein, addition of one or more compounds to system 100 may be controlled based on one or more detected operating conditions or parameters.

In accordance with one or more embodiments, the wastewater treatment system 100 can also include one ore more controllers for adjusting or regulating at least one operating parameter of the system or a component of the system, such as, but not limited to, actuating valves and pumps. The controller may be capable of monitoring and regulating the operating conditions of the wastewater treatment system including its components. The controller may be in communication with one or more sensors. The controller is typically a microprocessor-based device, such as a programmable logic controller (PLC) or a distributed control system, that receives and/or sends input and output signals to and from components of the wastewater treatment system. The controller may regulate the flow rate of streams within the wastewater treatment system. In some embodiments, the controller may control and/or adjust the addition of one or more compounds 130, 140 to system 100, such as to wet well 120.

The invention contemplates the modification of existing facilities to retrofit one or more systems, or components thereof in order to implement the techniques of the invention. Thus, for example, an existing facility can be modified to include a controller executing instructions in accordance with one or more embodiments exemplarily discussed herein. Alternatively, existing control systems can be reprogrammed or otherwise modified to perform any one or more acts of the invention. Existing wastewater treatment systems can be converted to wastewater treatment systems in accordance with systems and techniques described herein utilizing at least some preexisting equipment such as the shell and wetted parts. Existing facilities that were designed without certain provisions, such as sources of compounds 130 and/or 140, may be retrofitted without requiring significant construction efforts.

The function and advantages of these and other embodiments will be more fully understood from the following examples. These examples are intended to be illustrative in nature and are not to be considered as limiting the scope of the systems and methods discussed herein.

COMPARATIVE EXAMPLE

A buildup of floating solids in an operating municipal wastewater collection structure having low turnover and an excess of nitrates salts was observed. This lift station has about a 50,000 gallon wet well capacity and the average wastewater flow rate is about 200,000 gpd. Liquid calcium nitrate solution is routinely dosed at a rate of about 25 gpd for downstream prevention of hydrogen sulfide. It was determined by rough approximation that about 500-1000 ppm of nitrate ion is continuously present in the wet well.

A sample of floating solids was taken from the wet well and analyzed. A result of about 330,000 mg/kg of total oil and grease was determined on a dry weight basis. This is equivalent to about 33% of the total sample as total oil and grease. The remaining material was postulated to be aged biosolid as typically present in any municipal wastewater collection system.

EXAMPLE

A trial was conducted at a municipal wastewater treatment system to observe if the addition of a stabilized chlorine dioxide solution would have an effect on float formation in a wet well where Bioxide® treatment for odor control commercially available from Siemens Water Technologies Corp. is being used. The basis for the trial was observation and most of the evidence was is in the form of descriptions and photographs as discussed herein.

An Endimal® stabilized chlorine dioxide solution was proposed as the oxidizer to inactivate the mechanism responsible for the emission of nitrogen gas in a wet well. A small amount of oxidizer (15% active) was planned to be added with liquid calcium nitrate on an operating wet well. Small dosages (<100 ppm) of the oxidizer were used to stop the denitrification process and stop the formation of floating solids in the wet well.

During the course of the experiment, the amount of stabilized chlorine dioxide solution dosed was adjusted in an attempt to determine an optimal quantity for reduction in grease buildup. The Bioxide® feed did not change during this study. Two weeks prior to the dosing of the stabilized chlorine dioxide solution, the wet well was cleaned of grease. Observation of grease buildup occurred after only two weeks of normal Bioxide® dosing.

After the observation period of two weeks, the wet well was cleaned of grease again in order to ensure that only new grease formation was observed during the Bioxide® and stabilized chlorine dioxide solution trial period. Due to difficulties in quantifying results of an experiment of this nature, the results were expressed as the approximate percentage of surface area with grease formation along with a description of the grease layer and overall appearance of the wet well.

Table 1 lists the main characteristics of the wet well used for the trial which has a historic presence of nitrogen foam or "float."

TABLE 1

| Source | Municipal |
| --- | --- |
| Estimated BOD (ppm) | 200 |
| Average Estimated Flow (gpd) | 25,000-50,000 |
| Wet Well Size (gals) | 7,500 |
| Oxidizer dosage (gpd) | 0.5-2 |
| Nitrate dosage (gpd) | 7.6 |
| Estimated Oxidizer Conc. (ppm) | 40-500 ppm |
| Estimated Nitrate Conc. (ppm) | 439-878 ppm |
| Baseline Condition | Floating Solids Present |

Table 2 summarizes the amount of products utilized for treatment of the wet well and the results in terms of solids coverage in the wet well. Photographic data referenced therein is presented in FIGS. 2A-2H.

TABLE 2

| Day | Corresponding FIG. | Thin Grease Coverage [%] | Thick Grease Coverage [%] | Description of Grease | Oxidizer solution Feed [gallons/day] | Bioxide ® Feed [gallons/day] |
|---|---|---|---|---|---|---|
| 1 | — | 35% | 65% | Thick layer | 0 | 7.6 |
| 1 | — | 0% | 0% | Grease cleaned | 0 | 7.6 |
| 5 | 2A | 0% | 0% | — | 2 | 7.6 |
| 7 | 2B | 0% | 0% | — | 2 | 7.6 |
| 12 | 2C | 0% | 0% | — | 2 | 7.6 |
| 15 | — | 0% | 0% | — | 1 | 7.6 |
| 19 | 2D | 10% | 0% | Thin layer | 1 | 7.6 |
| 21 | 2E | 40% | 0% | Thin layer | 1 | 7.6 |
| 26 | 2F | 40% | 15% | Substantial layer, thin layer | 1 | 7.6 |
| 36 | — | | | | 0.5 | 7.6 |
| 40 | 2G | 30% | 70% | | 0.5 | 7.6 |
| 42 | 2H | 30% | 70% | | 0.5 | 7.6 |

Figure 3:
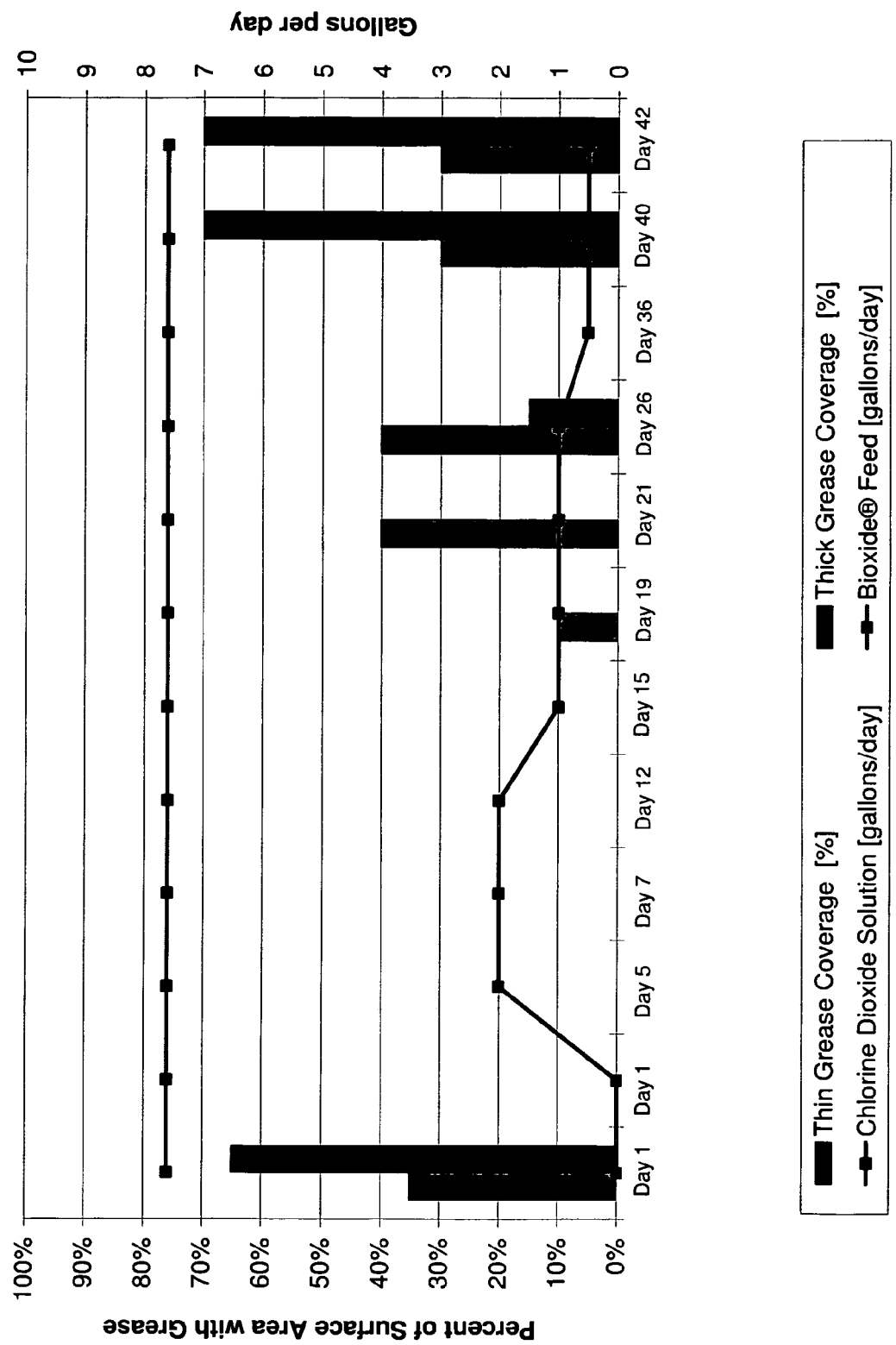
FIG. 3 presents graphical data referenced in the accompanying Example.

FIG. 3 is a graphical representation of trial results. The solids coverage, shown in percentage, is illustrated by columns, separated into two categories of thickness, and organized by date. The amount of oxidizer fed is shown as the black line in gallons per day. The graph in FIG. 3 demonstrates that as the feed of oxidizer was decreased, the grease became more prevalent, and the rate at which it accumulated increased.

The trials demonstrated that the addition of the chlorine dioxide solution to the wet well along with the optimized dose of Bioxide® treatment reduces float formation on the surface. Through the study, it was shown that the production of float in the wet well can be slowed at a rate proportional to the amount of chlorine dioxide solution supplied. The amount of stabilized chlorine dioxide solution decreased gradually over time and the amount of grease buildup was recorded. It was established that the amount and severity of grease buildup experienced in a wastewater system can be eliminated or reduced when stabilized chlorine dioxide solution is fed in conjunction with Bioxide®. An oxidizer feed of 40 ppm in the presence of 400-800 ppm estimated nitrate ion was effective in the prevention and elimination of floating solids.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of treating waste, comprising:
   dosing a nitrate to a waste stream comprising at least one undesirable constituent; and
   dosing an oxidizer to the waste stream in an amount sufficient to inhibit floatation of the at least one undesirable constituent.

2. The method of claim 1, further comprising regulating flow of at least one of the waste stream, the nitrate and the oxidizer.

3. The method of claim 2, wherein the flow of the oxidizer is regulated to establish a residual level of the oxidizer in the waste stream.

4. The method of claim 1, further comprising detecting an oxidation reduction potential level of the waste stream.

5. A method of facilitating waste treatment, comprising:
   providing a source of an oxidizer in response to detecting floatation of an undesirable constituent in wastewater treated with a nitrate.

6. The method of claim 5, further comprising providing instructions to dose the oxidizer to the wastewater consistent with an amount of the nitrate dosed to the wastewater.

7. The method of claim 6, further comprising providing a source of the nitrate.

8. The method of claim 5, wherein providing a source of an oxidizer comprises providing a source of chlorite.

* * * * *